United States Patent
Marinov et al.

(10) Patent No.: US 11,391,029 B2
(45) Date of Patent: Jul. 19, 2022

(54) VALVE DEVICE WITH CLEANING WIRE

(71) Applicant: AS America, Inc., Piscataway, NJ (US)

(72) Inventors: Marin Marinov, East Brunswick, NJ (US); Walter Pitsch, Washington, NJ (US); Eric Soberano, Barnegat, NJ (US); Koji Shimizu, Kitanagoya (JP); Kojiro Watari, Aichi (JP)

(73) Assignee: AS America, Inc., Piscataway, NJ (US)

( * ) Notice: Subject to any disclaimer, the term of this patent is extended or adjusted under 35 U.S.C. 154(b) by 0 days.

(21) Appl. No.: 17/051,639

(22) PCT Filed: May 17, 2019

(86) PCT No.: PCT/US2019/032840
§ 371 (c)(1),
(2) Date: Oct. 29, 2020

(87) PCT Pub. No.: WO2019/222609
PCT Pub. Date: Nov. 21, 2019

(65) Prior Publication Data
US 2021/0230853 A1    Jul. 29, 2021

Related U.S. Application Data

(60) Provisional application No. 62/673,659, filed on May 18, 2018.

(51) Int. Cl.
*E03D 3/06* (2006.01)
*F16K 21/12* (2006.01)
*F16K 31/385* (2006.01)

(52) U.S. Cl.
CPC ............... *E03D 3/06* (2013.01); *F16K 21/12* (2013.01); *F16K 31/3855* (2013.01)

(58) Field of Classification Search
None
See application file for complete search history.

(56) References Cited

U.S. PATENT DOCUMENTS

RE20,576 E     12/1937 Sloan
3,400,731 A *   9/1968 McCornack .............. E03D 3/12
                                                    251/39

(Continued)

FOREIGN PATENT DOCUMENTS

JP          2002327857 A      11/2002

OTHER PUBLICATIONS

International Search Report dated Nov. 7, 2019 in corresponding International Application No. PCT/US2019/032840 (7 pages).

*Primary Examiner* — Daphne M Barry
(74) *Attorney, Agent, or Firm* — Tyler A. Stevenson; Anna-Lisa L. Gallo

(57) ABSTRACT

Provided are valve devices and flow heads for a valve device. A valve device can include a valve body (30) that opens and closes a valve hole (15*a*) to allow communication between a primary flow path (17*a*) and a secondary flow path (17*b*), a back pressure chamber (7) defined at the back side of the valve body, a small hole (51) that is provided in the valve body to allow the primary flow path of and the back pressure chamber to communicate with each other, and a pin (6) that has a straight portion inserted into the small hole to clean the small hole by relative motions of the small hole and the straight portion. A flow head (34) may be annular and include one or more notches along a perimeter and be configured to engage with an inner peripheral surface of an upper end portion of an inner barrel of the valve device.

18 Claims, 13 Drawing Sheets

(56) References Cited

U.S. PATENT DOCUMENTS

| | | | | |
|---|---|---|---|---|
| 5,150,877 | A * | 9/1992 | Whiteside | E03D 3/06 |
| | | | | 251/120 |
| 5,167,251 | A * | 12/1992 | Kirstein | B60T 17/00 |
| | | | | 15/104.16 |
| 7,182,096 | B1 * | 2/2007 | Lordahl | B08B 9/00 |
| | | | | 137/244 |
| 8,069,877 | B2 * | 12/2011 | Jacobs | F16K 31/408 |
| | | | | 137/513.5 |
| 9,644,759 | B2 * | 5/2017 | Wilson | E03D 5/092 |
| 2010/3197920 | | 12/2010 | Kohler | |
| 2018/0142804 | A1 * | 5/2018 | Buchmueller | F16K 31/1221 |
| 2018/1428040 | | 5/2018 | Grohe | |

\* cited by examiner

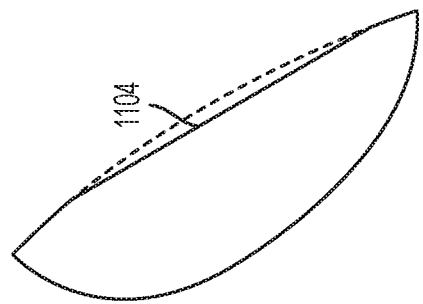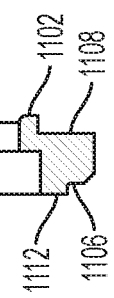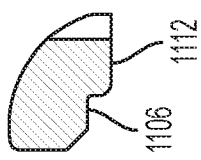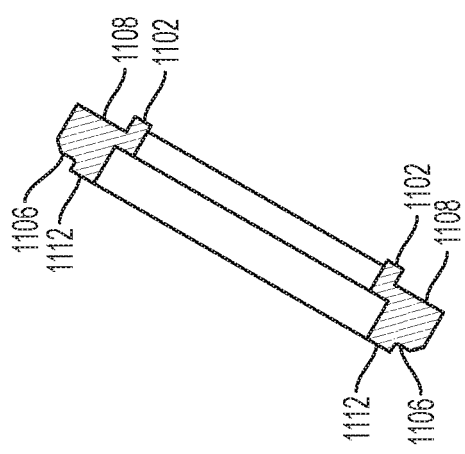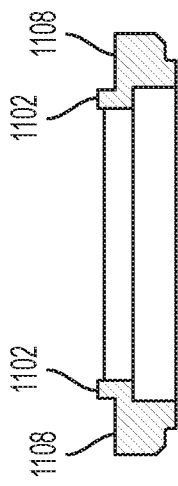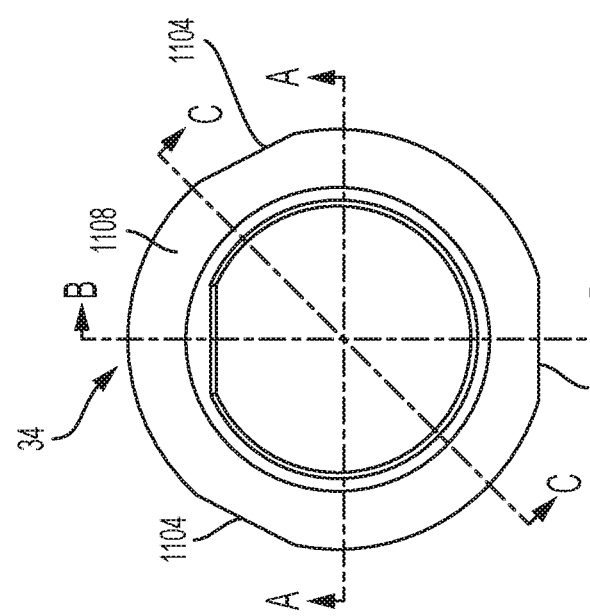

VALVE DEVICE WITH CLEANING WIRE

REFERENCE TO RELATED APPLICATIONS

This application claims the benefit of U.S. Provisional Application No. 62/673,659, filed May 18, 2018, the entire contents of which are hereby incorporated by reference herein.

FIELD OF THE INVENTION

The present invention relates to valve devices. In particular, the present invention relates to flush valve devices.

BACKGROUND OF THE INVENTION

Unlike most residential buildings, commercial buildings typically have a large water supply line. Thus, modern commercial toilets and urinals often include a flushometer, instead of a water tank of most residential-type toilets. A flushometer requires a large water supply line to operate properly. A flushometer uses the water pressure from the large water supply line to provide a high-pressure flush.

Flush valves typically include a diaphragm separating a pressure chamber (or back pressure chamber) from the main water supply. When a flush valve is in steady state (not cycling through a flush), the water in the pressure chamber presses down on the relief valve, which presses down on the diaphragm, forcing the valve closed. To begin a flush cycle, a lateral force is provided on a stem of the valve assembly, causing the stem to tilt. The tilt of the stem forces a relief valve open, allowing water to flow from the pressure chamber down through the main valve. This mechanism simultaneously creates an opening leading to a main water supply, allowing water from a main water supply to flow through the main valve and to a toilet bowl to flush the toilet. To end a flush cycle, the relief valve slowly returns to its original position, shutting off the water supply to the toilet bowl and allowing the back pressure chamber to refill.

Some flush valves may include a refill orifice that includes a small hole in the main relief valve and/or a pin that inserts into the small hole. The small hole carr provide a communication path between the back pressure chamber and a flow path (leading out of the flush valve device and into a toilet bowl). The pin may serve to clean the small hole by moving up and down and/or rotating within the hole, preventing the hole to become clogged with dirt or foreign matter, for example.

However, cleaning pin designs known in the art are not suitable for downsizing. Current cleaning pins typically include a coil spring mechanism that can cause the cleaning pin to move up and down to clean the hole. Thus, flush valves comprising a cleaning pin with a coil spring mechanism require that during an open or water-passing state, the flush valve must keep a length from the bottom portion of the back pressure chamber to the main valve that is at least equal to or longer than the solid height of the coil spring. Accordingly, the presence of this relatively large coil spring mechanism prevents current flush valves from easily being downsized.

In addition, as a flush valve closes at the end of a flush cycle, it can sometimes generate a water hammer effect. A water hammer effect occurs when a valve closes too abruptly, causing a pressure spike. The water hammer effect can cause instability in the flush valve, manifesting in loud noise, vibrations, and in extreme situations, pipe collapse.

SUMMARY OF THE INVENTION

Accordingly, described are products and methods for downsizing a flush valve and minimizing the water hammer effect in commercial flushometers. In particular, described are improved cleaning pin structures and methods that enable a flush valve to be downsized. Specifically, inventors have developed a pin design that eliminates the bulky coil spring mechanism of current designs but still enables the pin to move up and down and rotate within the hole for cleaning. Accordingly, this pin design allows for downsizing of a flush valve.

Additionally, the water hammer effect often characteristic of commercial toilets and urinals can be very destructive to the piping/plumbing system and disruptive to users. Accordingly, inventors have developed a flow head device that minimizes the force with which a main valve may close at the end of a flush cycle.

In some embodiments, a flush valve may include a flow head. The flow head may help throttle down the water flow during a valve-closing phase and help control the flush volume. For example, during a valve-closing process, the diaphragm may slowly move back to its original position and slowly engage with a flow head. Additionally, a flow head may comprise one or more notches along an outer perimeter. These notches may pe some water to flow through the flow head during the valve-closing process, minimizing any pressure spike that may occur during the closing of the flush valve, and thus, minimizing the hammer water effect.

In some embodiments, a valve device is provided, the valve device comprising: a valve body configured to open and close a valve hole allowing communication between a primary side and a secondary side of a flow path; a back pressure chamber positioned at a back side of the valve body; a hole in the valve body to allow communication between the primary side of the flow path and the back pressure chamber; and a pin comprising a straight portion inserted into the hole to clean the hole by relative motions of the hole and the straight portion, wherein the pin comprises a contact portion that extends radially from a first end of the straight portion and contacts a peripheral edge of the small hole.

In some embodiments of a valve device, the contact portion is inclined in a direction from the first end to a second end of the straight portion and is elastic in an axial direction of the straight portion.

In some embodiments of a valve device, the contact portion is wound around the straight portion by one or less turn.

In some embodiments of a valve device, the contact portion is wound in a three-dimensional spiral shape, such that a winding radius of the coil shape becomes larger with increasing proximity from the straight portion, and the contact portion is wound one or more turns from the first end of the straight portion towards a second end of the straight portion of the pin.

In some embodiments of a valve device, the pin comprises a retaining portion that bends at a second end of the straight portion and extends to a leading end, wherein the retaining portion is longer than an axial dimension of the hole.

In some embodiments of a valve device, the valve body comprises an elastic diaphragm provided with a hole at a peripheral edge, wherein the hole is formed as a cylindrical hole in a cylindrical member fitted into the hole, and wherein the contact portion is in contact with an end surface of the cylindrical member, and wherein the cylindrical member comprises a hardness that is greater than a hardness of the diaphragm.

In some embodiments, a valve device is provided, the valve device comprising: a valve body configured to open and close a valve hole allowing communication between a primary side and a secondary side of a flow path; a back pressure chamber positioned at a back side of the valve body; and an annular flow head positioned below the valve body, the flow head comprising one or more notches along a perimeter and configured to engage with an inner peripheral surface of an upper end portion of an inner barrel of the valve device.

In some embodiments of the valve device, the flow head comprises three notches carved away from an edge of an exterior perimeter of the flow head.

Additional advantages of this invention will become readily apparent to those skilled in the art from the following detailed description. As will be realized, this invention is capable of other and different embodiments, and its details are capable of modifications in various obvious respects, all without departing from this invention. Accordingly, the examples and description are to be regarded as illustrative in nature and not as restrictive.

BRIEF DESCRIPTION OF THE DRAWINGS

Exemplary embodiments of the invention will now be described with reference to the accompanying figures, in which:

FIGS. 11A-11F are various views of a flow head according to some embodiments;

DETAILED DESCRIPTION OF THE INVENTION

Figure 1:
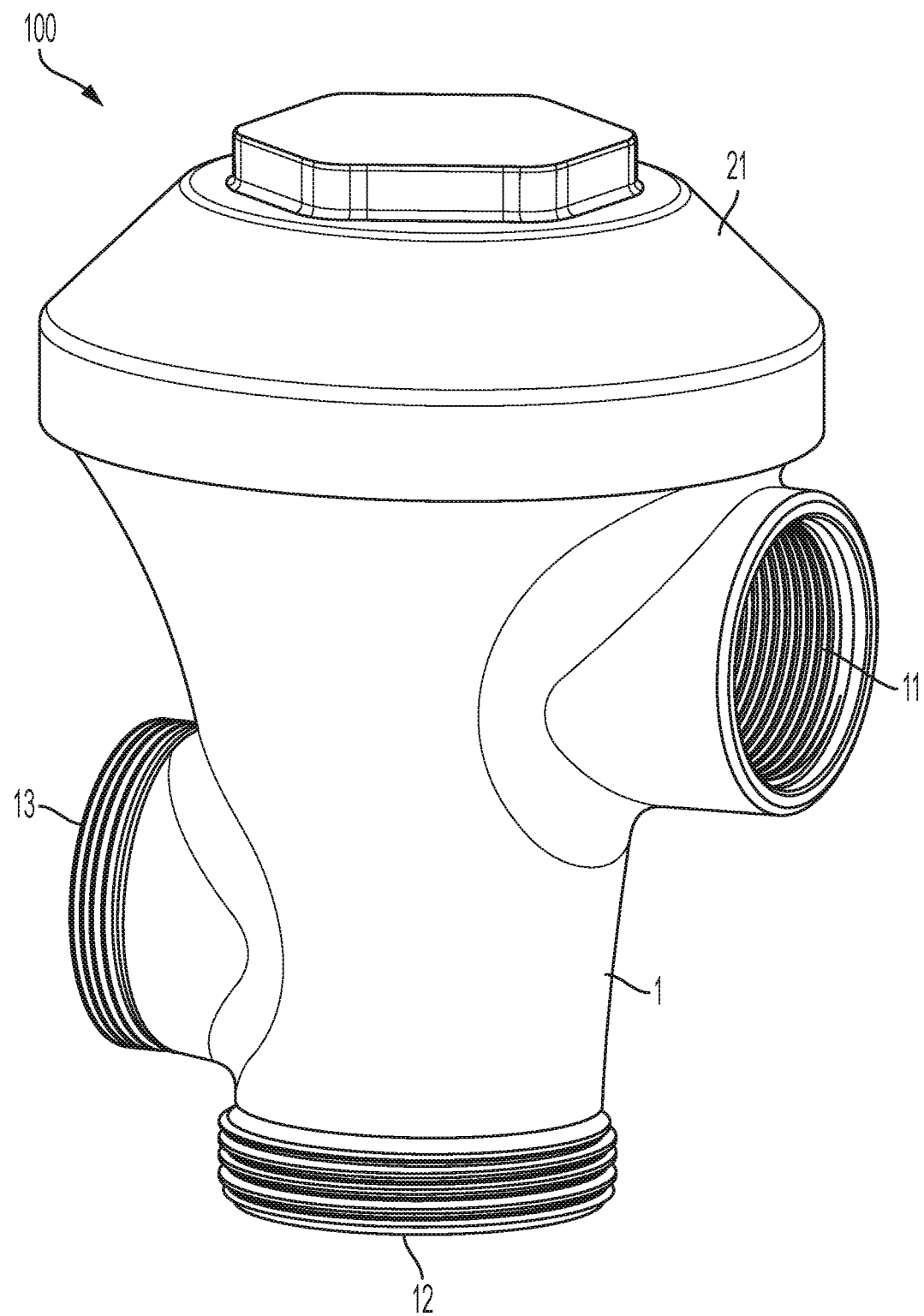
FIG. 1 is a perspective external view of a valve device according to some embodiments.

Described are improved flush valves and flow head devices for flush valves. In particular, described are improved flush valves that may be downsized without compromising any features and flow head devices that can minimize any water hammer effect in a flushometer.

The inventors have developed a product that allows for a flush valve to be resized without compromising any features of the valve. For example, cleaning pins known in the art cannot simply be downsized proportionally with the flush valve itself while maintaining proper operability. Instead, most pins of conventional valve devices comprise a coil spring mechanism. However, this coil spring prevents the flush valve from being downsized. The inventors have developed a pin design that eliminates the bulky coil spring mechanism but can still move up and down and rotate to clean the hole in the main relief valve. Accordingly, pin designs according to embodiments herein allow for downsizing of a flush valve.

Additionally, inventors have developed a flow head device that minimizes the water hammer effect common to commercial-type toilets. A water hammer effect can occur during the end of a flush cycle. If a flush valve of a flushometer closes too abmptly at the end of a flush cycle, it may cause a pressure spike. This pressure spike can cause loud noise, vibrations, and pipe collapse. However, the inventors have developed a flow head device for a flush valve that helps minimize or eliminate any pressure spike caused by an abruptly closed flush valve. Accordingly, flow head devices according to embodiments herein minimize a water hammer effect.

Various embodiments of flush valves will be described below with reference to FIGS. 1 through 11. Identical or equivalent components illustrated in the drawings are thven identical reference signs, and duplicated descriptions thereof are omitted as appropriate.

Figure 2:
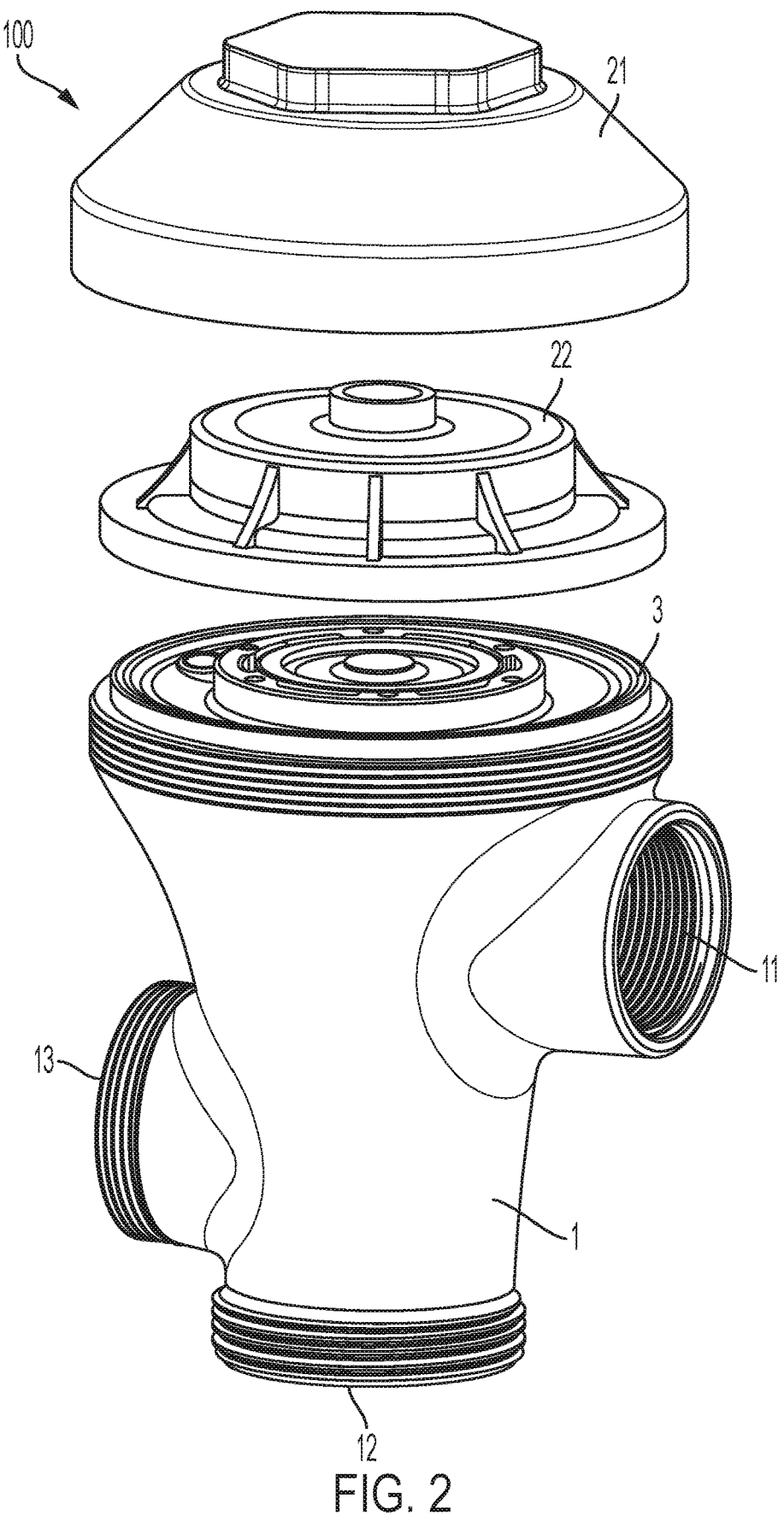
FIG. 2 is an exploded perspective view of the valve device according to some embodiments.

FIG. 1 is a perspective external view of a valve device 100 according to some embodiments, and FIG. 2 is an exploded perspective view of the valve device according to some embodiments. In some embodiments, valve device 100 may be a diaphragm-type flush valve device. In some embodiments, valve device 100 may be a different type of valve device that operates by flowing a liquid through a small hole. In some embodiments, valve device 100 includes main body 1, outer cover 21, inner cover 22, and/or valve assembly 3. Main body 1 may be cylindrical in shape and may have inlet connection 11, outlet connection 12, and/or operational attachment 13.

In some embodiments, inlet connection 11 may be provided on a side surface in an upper portion of main body 1 and connected to a feed pipe for feeding a liquid such as water. In some embodiments, outlet connection 12 may be provided on a bottom surface in a lower portion of main body 1 and connected to a discharge pipe for discharging a liquid. Operational attachment 13 may be provided on a side surface in a middle portion of main body 1 and may have an operating portion (not illustrated) attached to activate valve assembly 3. The operating portion may have an operational member such as a lever or a push button, for example. In some embodiments, the operational member may be operated to move stem 41 of valve assembly 3 as described below. Valve assembly 3 may be assembled in main body 1, and inner cover 22 and outer cover 21 may be positioned to cover valve assembly 3 from above.

Figure 3:
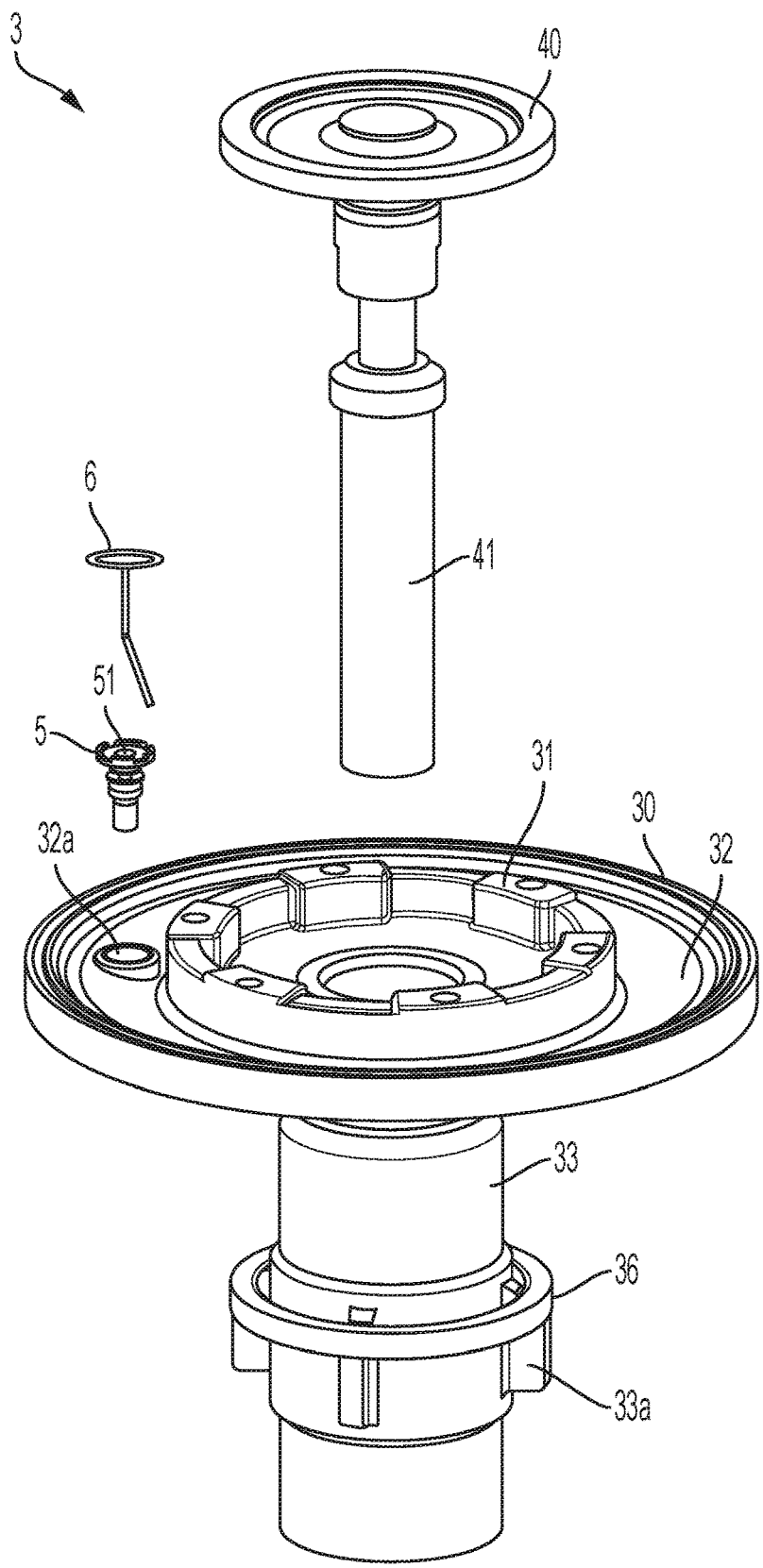
FIG. 3 is an exploded perspective view of a valve.

FIG. 3 is an exploded perspective view of valve assembly 3. In some embodiments, valve assembly 3 includes valve body 30, sleeve pipe 33 including one or more plate-like guide 33a, and relief valve 40. Valve body 30 may have retainer 31 for storing relief valve 40 in the center and elastic diaphragm 32 along a peripheral edge. In some embodiments, retainer 31 may he ring-shaped and may project from an upper surface of valve body 30. Diaphragm 32 may comprise any of various materials including, but not limited to, a rubber, a resin, and/or a polymer. These materials may exhibit various mechanical characteristics including, but not limited to, strength, hardness, and ductility, Retainer 31 and diaphragm 32 may be formed integrally or may be formed separately and then assembled. Additionally, valve assembly 3 may include a fill ring 36 located around sleeve pipe 33. Fill ring 36 may be held onto sleeve pipe 33 by plate-like guides 33a such that fill ring 36 does not slip off.

In some embodiments, diaphragm 32 may have hole 32a penetrating from a front to back side. Cylindrical member 5 may be positioned into hole 32a. In some embodiments, a lower end portion of cylindrical member 5 is fitted and fixed to a lower end portion of hole 32a to prevent cylindrical member 5 from coming off. Cylindrical member 5 may be formed from various materials, including but not limited to, a resin, a rubber, and/or another polymer. In some embodiments, cylindrical member 5 may comprise a material of greater hardness than that of diaphragm 32.

In some embodiments, valve device 100 may comprise a refill orifice. A refill orifice may include small hole 51 that may be formed as a cylindrical hole in cylindrical member 5. Some embodiments of a refill orifice may also include pin 6, which may be inserted into small hole 51. In some embodiments, pin 6 in small hole 51 is optional, and valve device 100 including a refill orifice may function sufficiently without pin 6. In addition, some embodiments of diaphragm 32 may include only hole 32a and not a cylindrical member 5 at all. The hole 32a may be configured to provide the benefits of the cylindrical member 5.

In some embodiments, sleeve pipe 33 may be fixed to valve body 30. Plate-like guides 33a may project from a side surface. Relief valve 40 may be coupled to stem 41 extending downwardly. In some embodiments, stem 41 may be inserted into a center of valve body 30 from above and held in retainer 31. When a lower portion of stem 41 is pressed laterally, relief valve 40 may be tilted together with stem 41.

Fill ring 36 may be located around sleeve pipe 33 and held on by one or more plate-like guide 33a. In some embodiments, fill ring 36 may fit loosely around sleeve pipe 33 such that fill ring 36 can slide up and down sleeve pipe 33. Fill ring 36 may reduce variation from flush to flush by minimizing the water volume variation between flushes. This reduction in water volume variation between flushes may eliminate some erratic behavior, particularly when operating at high pressure and/or high volume.

Figure 4:
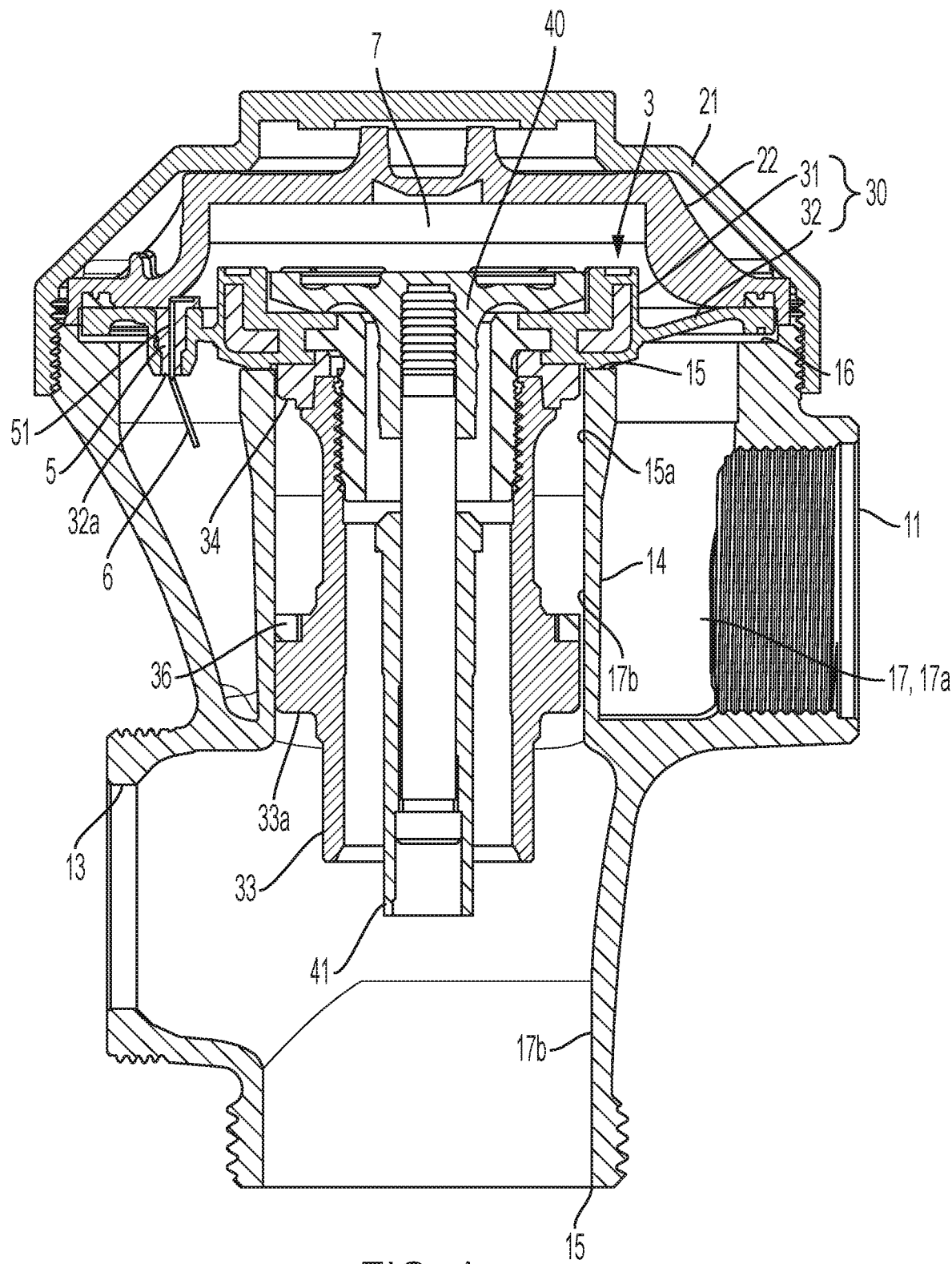
FIG. 4 is a vertical cross-sectional view of a valve device.

FIG. 4 is a vertical cross-sectional view of valve device 100. Cylindrical inner barrel 14 may be integrally provided in main body 1. In some embodiments, valve seat 15 may be formed at an upper end of inner barrel 14. Valve hole 15a may be formed by an inner peripheral edge of valve seat 15. In some embodiments, valve assembly 3 may be attached to valve device 100 such that sleeve pipe 33 is inserted into inner barrel 14 from above, and a peripheral edge of diaphragm 32 in valve body 30 is placed on shoulder 16 of an upper end portion of main body 1 and pushed by a bottom surface of a peripheral edge of inner cover 22.

In some embodiments, flow head 34 may be positioned between a bottom surface of valve body 30 and an upper end portion of sleeve pipe 33. In some embodiments, an outer peripheral surface of flow head 34 may be removably fitted into an inner peripheral surface of an upper end portion of inner barrel 14. Valve body 30, sleeve pipe 33, and flow head 34 may move upwardly and downwardly in an integral manner. In some embodiments, guides 33a of sleeve pipe 33 may suppress any lateral swing of valve body 30, sleeve pipe 33, and/or flow head 34 in inner barrel 14.

In some embodiments, flow head 34 may be annular in shape. Flow head 34 may comprise a thermoplastic polymer material such as polyoxymethylene (POM), polyurethane, acrylonitrile butadiene styrene (ABS), and/or any combination thereof. Flow head 34 may be solid, or it may be hollow or otherwise comprise an internal three-dimensional lattice or honeycomb-type structure.

In some embodiments, diaphragm 32 and/or retainer 31 may have a flat, smooth, upper and/or lower surface. With a flat, smooth upper surface, the top surface of diaphragm 32 and/or retainer 31 may generate a seal with a lower surface of inner cover 22, causing the valve device to remain open indefinitely. Accordingly, diaphragm 32 and/or retainer 31 may comprise a harder plastic and/or a three-dimensional uppermost surface to minimize this sealing effect.

For example, an uppermost surface of diaphragm 32 and/or retainer 31 may be three-dimensional. One or more recesses may be disposed in an upper surface of diaphragm 32 and/or retainer 31 to create depth or dimension to the surface such that the uppermost surface of diaphragm 32 and/or retainer 31 is not flat and smooth. For example, diaphragm 32 of FIG. 4 shows an uppermost surface comprising not a single, horizontal surface, but instead stepping up and down several times across the width/diameter of diaphragm 32 and similarly with retainer 31. Accordingly, an uppermost surface of diaphragm 32 and/or retainer 31 may comprise numerous vertical, horizontal, and/or diagonal surfaces such that the uppermost surface of diaphragm 32 and/or retainer 31 is not flat and smooth along a single plane.

An outer most rim of diaphragm 32 and/or retainer 31 may be of various heights. A rim of diaphragm 32 and retainer 31 are shown in FIG. 4 located between, and in contact with a lower surface of inner cover 22 and the diaphragm 32 is further in contact with shoulder 16 of an upper end portion of main body 1. A height of this outermost rim of diaphragm 32 and/or retainer 31 may be adjusted to minimize the possibility of creating a seal between an upper surface of diaphragm 32 and/or retainer 31, and inner cover 22.

In some embodiments, flow path 17 extends from inlet connection 11 to outlet connection 12 and includes primary flow path 17a from inlet connection 11 to valve hole 15a. In some embodiments, flow path 17 includes secondary flow path 17b that extends from valve hole 15a through a space formed inside the inner barrel 14 and outside sleeve pipe 33 to outlet connection 12.

In some embodiments, back pressure chamber 7 is defined by flow path 17 between upper surface of valve body 30 and an interior wall of dish-like inner cover 22. Small hole 51 allows primary flow path 17a and back pressure chamber 7 to communicate with each other and form a flow path in the space between an inner peripheral surface of small hole 51 and an outer peripheral surface of pin 6.

Additionally, valve device 100 may include a fill ring 36 located around sleeve pipe 33 of valve assembly 3. Fill ring 36 may be loose around sleeve pipe 33 to allow for movement of fill ring 36 up and down sleeve pipe 33. One or more guides 33a may prevent fill ring 36 from sliding down and off of sleeve pipe 33. In some embodiments, fill ring 36 may reduce variation between flushes. Particularly, fill ring 36 may eliminate some erratic behavior from flush to flush of valve device 100.

Some bodiments of valve device 100 may include a refill orifice. Refill orifice may include pin 6 within small hole 51. Some embodiments may not include pin 6 within small hole 51, and may instead include another suitable mechanism for cleaning small hole 51. In addition, in some embodiments, diaphragm 32 may include only hole 32a and not cylindrical member 5 at all. The hole 32a may be configured to provide the benefits of the cylindrical member 5.

Figure 5:
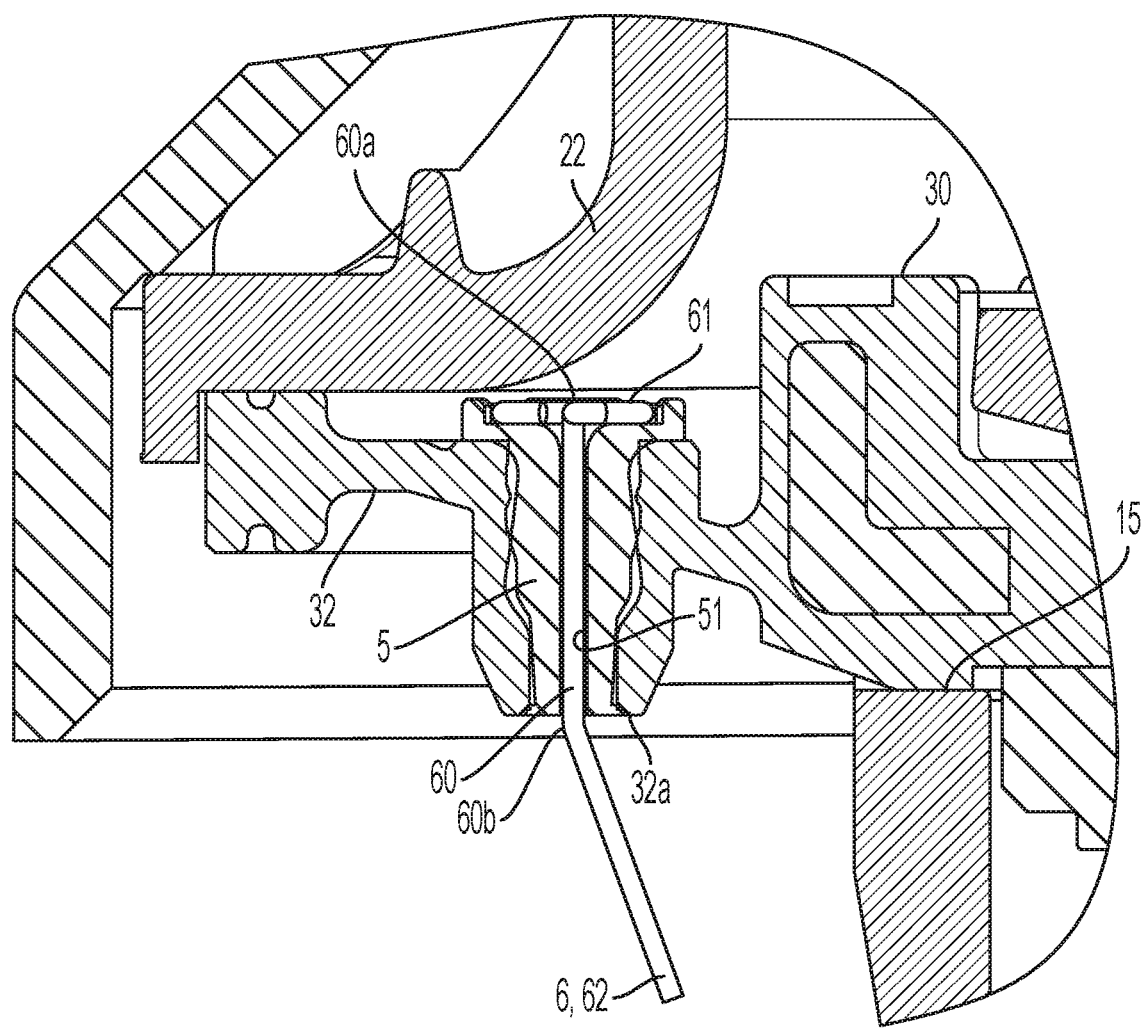
FIG. 5 is an enlarged cross-sectional iew of a small hole and a pin.

Pin 6 can be improved in structure for cleaning the small hole by suppressing the length of the protrusion of pin 6 from an upper end surface of the small hole 51, as well as eliminating the coil spring mechanism of the prior art. For example, FIG. 5 is an enlarged cross-sectional view of small hole 51 and pin 6 according to some embodiments. In some embodiments, pin 6 has straight portion 60 inserted into small hole 51 and contact portion 61 that bends from end 60*a* of straight portion 60 at a first end and extends radially and contacts a peripheral edge of small hole 51. In some embodiments, retaining portion 62 bends from end 60*b* of straight portion 60 at a second end and extends to a leading end. Pin 6 may be formed of a metal such as stainless steel, for example, or any other suitable material. Straight portion 60 may be longer than an axial dimension of small hole 51 and may protrude from small hole 51.

A refill orifice of valve device 100 may be located at various positions on diaphragm 32. For example, a refill orifice including small hole 51 and/or pin 6 may be located proximate to a center of diaphragm 32, proximate to a rim of diaphragm 32, or somewhere between a rim and a center of diaphragm 32. In some embodiments, the location of the refill orifice about the circumference of the diaphragm 32 may be closer to the inlet connection 11 or closer to the outlet connection 12, or somewhere there between. The location of the refill orifice may assist with the control of the flow rate through the valve.

Contact portion 61 of pin 6 may be inclined in a direction from a first end toward a second end of straight portion 60. Further, contact portion 61 may be elastic in an axial direction of straight portion 60. In some embodiments, contact portion 61 may extend radially from end 60*a* of straight portion 60 at a first end and may extend circumferentially to wind around straight portion 60 by one or less turn. Pin 6 may be shaped such that an area at a first end of straight portion 60 increases radially. End 60*a* of straight portion 60 at a first end may be opposite to interior wall of inner cover 22 forming back pressure chamber 7. In some embodiments, when valve body 30 moves upwardly, a point between end 60*a* of straight portion 60 at a first end and contact portion 61 contacts interior wall. When valve body 30 further moves upwardly, straight portion 60 may be pushed into small hole 51. Pin 6 may be in constant contact with interior wall of inner cover 22 at a point between end 60*a* of straight portion 60 at a first end and contact portion 61 such that, when valve body 30 moves upward, straight portion 60 is pushed into small hole 51.

In some embodiments, when pin 6 is pulled out at contact portion 61 side, retaining portion 62 of pin 6 may be latched on a peripheral edge of small hole 51 and may serve as a retainer for pin 6. Retaining portion 62 may be longer than an axial dimension of small hole 51. Retaining portion 62 may comprise a straight shape as well as straight portion 60.

In some embodiments of valve device 100, liquid flows from primary flow path 17*a* through small hole 51 into back pressure chamber 7, and when the pressure in back pressure chamber 7 increases and a bottom surface of relief valve 40 contacts valve body 30, valve body 30 is depressed. In some embodiments, depressed valve body 30 under pressure in back pressure chamber 7 may be seated on valve seat 15 to shut off communication between primary flow path 17*a* and secondary flow path 17*b*, closing valve hole 15*a*.

In some embodiments, when operating portion of main body 1 operates, stem 41 in valve assembly 3 may move at an incline, crossing the axial direction. Relief valve 40 may incline along with stem 41 to generate a gap between a bottom surface of relief valve 40 and valve body 30. In some embodiments, liquid in back pressure chamber 7 may flow out toward sleeve pipe 33 to decrease the pressure in back pressure chamber 7. With this decrease in pressure of back pressure chamber 7, valve body 30 may rise and separate from valve seat 15 due to elasticity of diaphragm 32, opening valve hole 15*a*. When valve hole 15*a* opens, primary flow path 17*a* may communicate with secondary flow path 17*b* to flow liquid from primary flow path 17*a* to secondary flow path 17*b*.

In some embodiments, when stem 41 returns to an original installation state (non-inclining state), a bottom surface of relief valve 40 contacts valve body 30, and liquid may flow again from primary flow path 17*a* through small hole 51 into back pressure chamber 7, depressing valve body 30. When valve body 30 is depressed under the pressure in back pressure chamber 7, valve body 30 approaches valve seat 15 and may be seated on valve seat 15. In some embodiments, when valve body 30 is seated on valve seat 15, communication between primary flow path 17*a* and secondary flow path 17*b* shuts off to close valve hole 15*a*. Accordingly, valve device 100 may discharge a specific flow of liquid to secondary flow path in a specific period of time.

Figure 6:
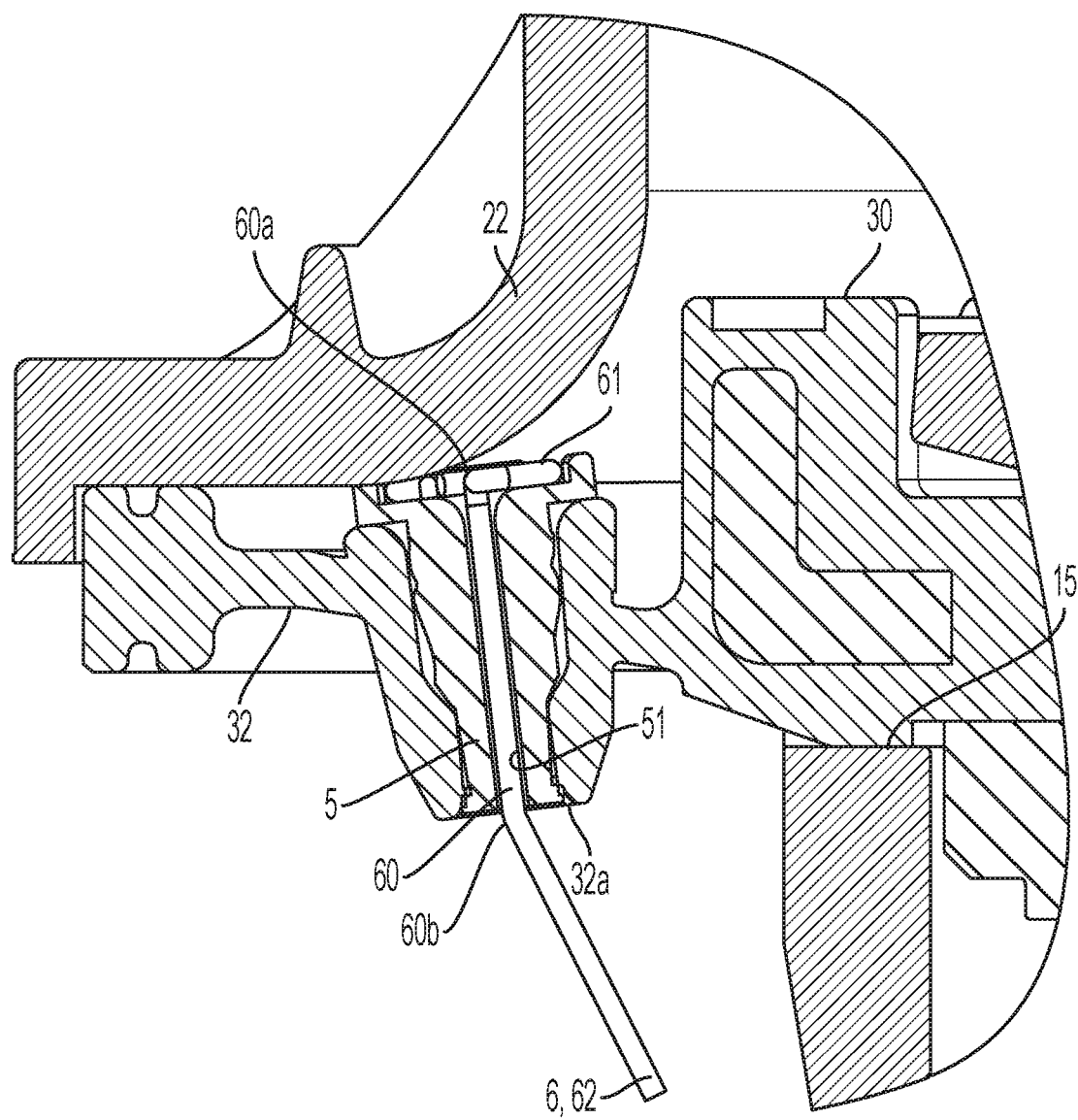
FIG. 6 is a schematic diagram describing a cleaning operation by a pin.

FIG. 6 is a schematic diagram illustrating a cleaning operation by pin 6. Specifically, some embodiments of a valve device may comprise a refill orifice comprising small hole 51 that passes through diaphragm 32. Small hole 51 may comprise a cleaning pin 6. In some embodiments, when valve body 30 rises and separates from valve seat 15, a location between end 60*a* of straight portion 60 at a first end and contact portion 61 contacts interior wall of inner cover 22. In some embodiments, when valve body 30 moves upwardly, straight portion 60 is pushed into small hole 51 and brought into a position illustrated in FIG. 6. When straight portion 60 is pushed into small hole 51 and makes a sliding motion relative to small hole 51, pin 6 may remove dust and foreign matter from small hole 51 and may clean small hole 51.

Figure 7:
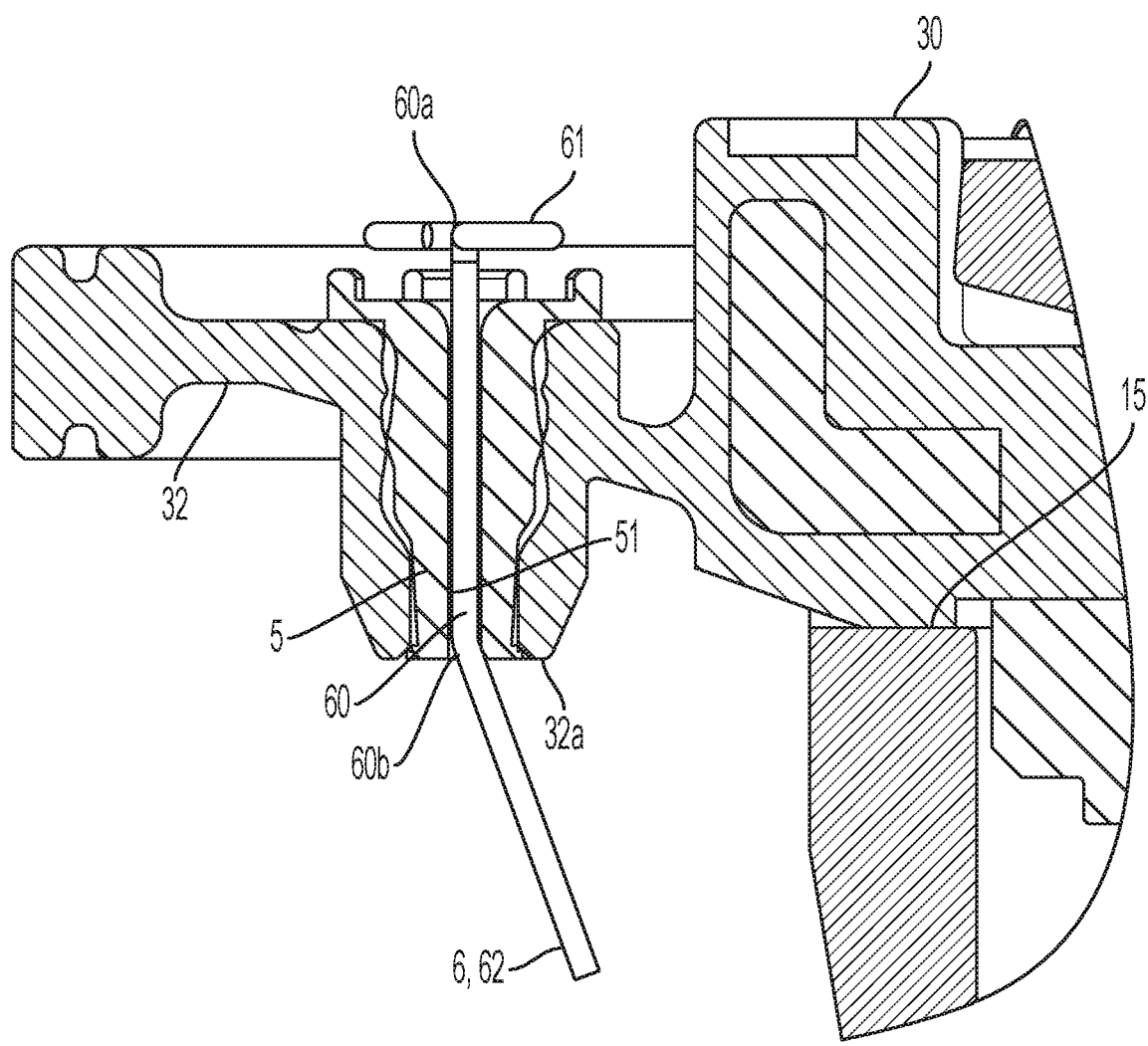
FIG. 7 is a schematic diagram describing a cleaning operation by a pin.

In some embodiments, pin 6 may also clean small hole 51 by rotating within the hole. For example, FIG. 7 shows a schematic diagram describing a cleaning operation by pin 6. In some embodiments, when liquid strikes retaining portion 62. retaining portion 62 turns to rotate pin 6. In addition, when some point between end 60*a* of straight portion 60 at a first end and contact portion 61 contacts the interior wall of the inner cover 22, pin 6 may also rotate due to a force exerted thereon. The rotation of pin 6 may move dust and foreign matter entered in small hole 51, and a flow of liquid discharges dust and foreign matter outside of small hole 51.

In some embodiments, pin 6 may be in contact with a peripheral edge of small hole 51 at a first end and may protrude a short length from valve body 30, which may make it possible to suppress increase in a height of back pressure chamber 7. In some embodiments, contact portion 61 of pin 6 may be inclined in a direction from a first end toward a second end of straight portion 60 and may be elastic in an axial direction of straight portion 60, thereby allowing pin 6 to make a sliding motion relative to small hole 51.

In some embodiments, contact portion 61 of pin 6 may extend radially from end 60*a* of straight portion 60 at a first end, and may also extend circumferentially to wind around a straight portion 60 by one or less turn. Accordingly, when the straight portion 60 of pin 6 is pushed into small hole 51, contact portion 61 may resemble a spiral when viewed from above. This may reduce the length of a protrusion of contact portion 61 from an end surface of small hole 51 to a degree of thickness of pin 6.

As shown in FIG. 7, pin 6 may comprise a bend where straight portion 60 joins retaining portion 62. Further, pin 6 may be mobile within hole 51. For example, pin 6 may be configured to move up and down in hole 51 and be configured to rotate within hole 51 for cleaning. Thus, in some embodiments, a bend of pin 6 may be located flush with a bottom of hole 51 such that straight portion 60 is within hole 51 and/or extending upwardly from hole 51, but not extending downwardly from hole 51. In some embodiments, retaining portion 62 may prevent pin 6 from moving upwardly when an upper portion of retaining portion 62 is located at a bottom of hole 51 and the bend of pin 6 is located flush with the bottom of hole 51.

In some embodiments, retaining portion 62 of pin 6 may be longer than an axial dimension of small hole 51. To insert pin 6 into small hole 51, a leading end of retaining portion 62 may be inserted into small hole 51 and protruded out of an opposite side of small hole 51. A bending portion between straight portion 60 and retaining portion 62 (end 60b of straight portion 60) may be brought into a linear or slightly bent position, allowing for insertion into small hole 51. This configuration may prevent an inner peripheral surface of small hole 51 from being scratched by a leading end of retaining portion 62.

Small hole 51 may comprise the same material as that of cylindrical member 5. In some embodiments, the material of small hole 51 may comprise a hardness greater than that of diaphragm 32. In some embodiments, the material of small hole 51 may suppress the occurrence of scratches and wear on an inner peripheral surface and an end surface of small hole 51 by contact with pin 6.

Figure 8:
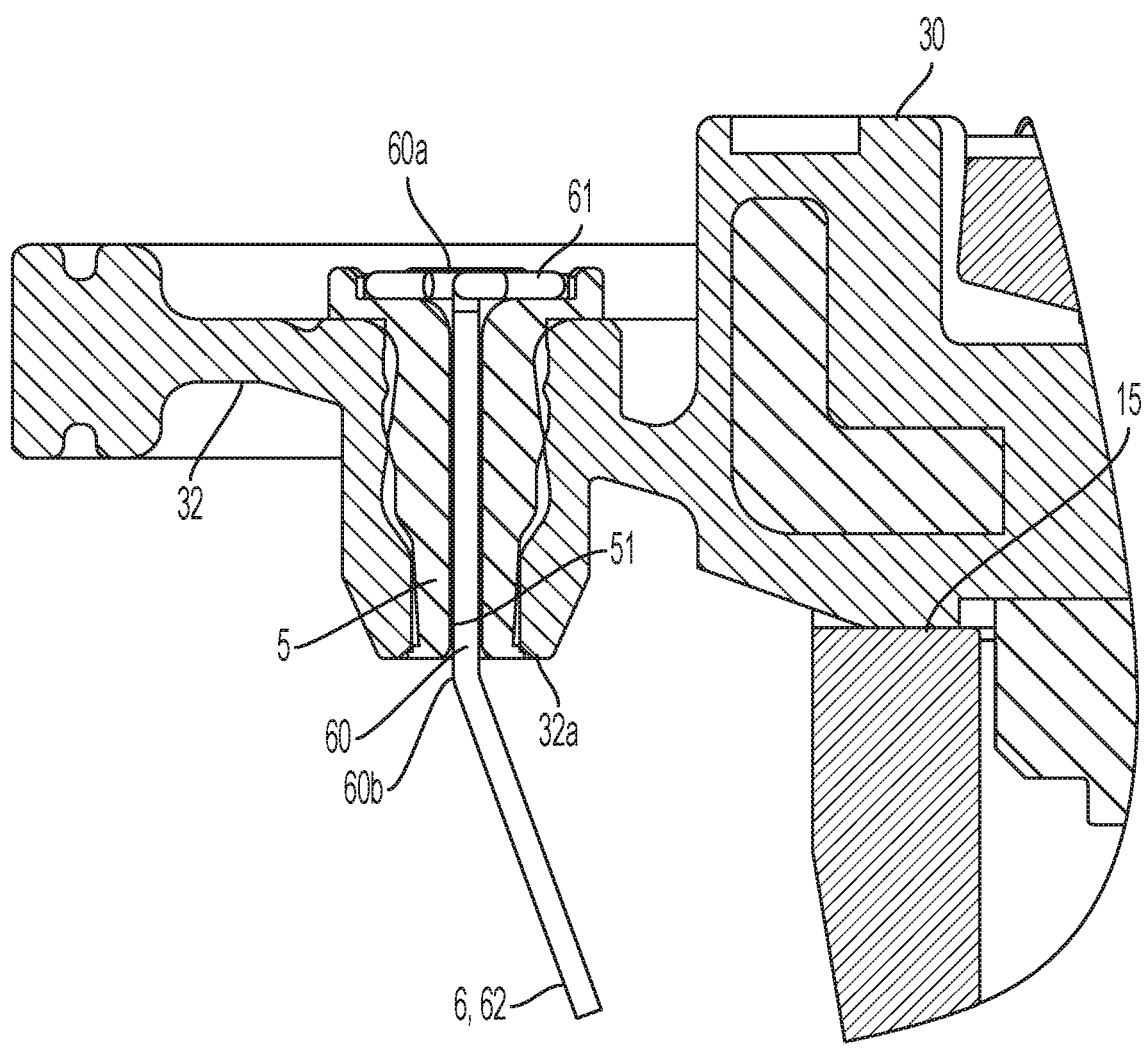
FIG. 8 is a cross-sectional view of a pin portion according to some embodiments.

FIG. 8 is a cross-sectional view of pin 6 according to some embodiments. For example, pin 6 of FIG. 8 comprises contact portion 61 that bends at a right angle from end 60a of straight portion 60 at a first end and extends radially to contact a peripheral edge of small hole 51. In some embodiments, pin 6 may not comprise elasticity for sliding axially straight portion 60 into small hole 51.

In some embodiments, when liquid flows through small hole 51 and strikes contact portion 61, pin 6 may be subjected to force in an axial direction of straight portion 60, causing straight portion 60 to slide axially through small hole 51. In some embodiments, a location of straight portion 60 between end portion 60a at a first end and contact portion 61 may contact an interior wall of inner cover 22, causing straight portion 60 to push into small hole 51. In addition, as described above, when liquid strikes retaining portion 62, retaining portion 62 may turn to rotate pin 6. Further, a protrusion of pin 6 from valve body 30 may be small enough in length to prevent an increase in a height of back pressure chamber 7.

Figure 9:
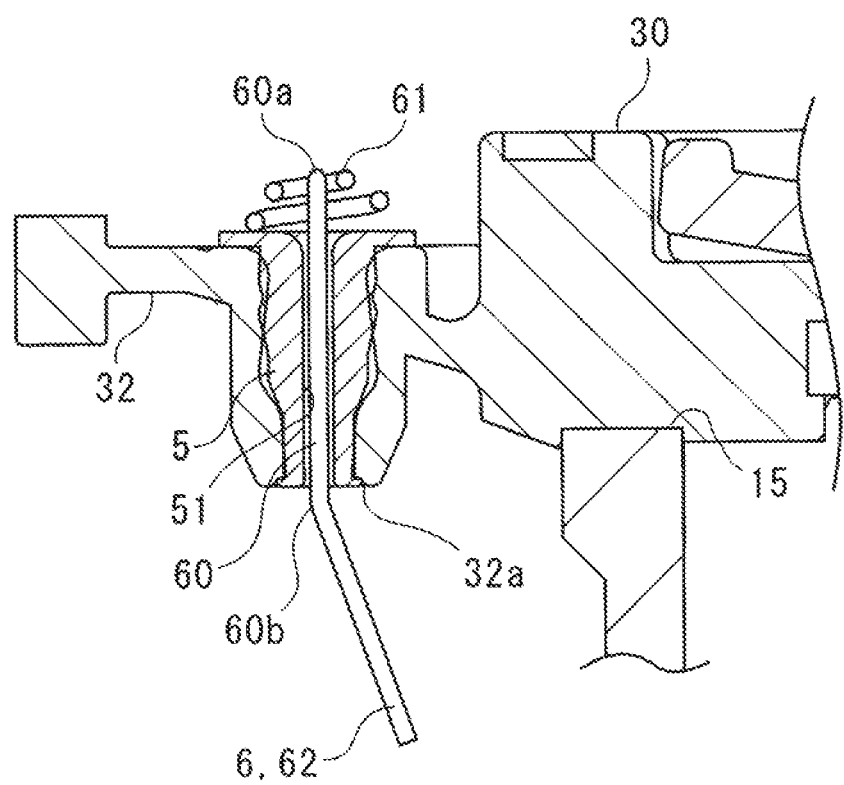
FIG. 9 is a cross-sectional view of a pin portion according to some embodiments.

FIG. 9 is a cross-sectional view of pin 6 according to some embodiments. Contact portion 61 of pin 6 may extend radially from end 60a of straight portion 60 at a first end and may also extend circumferentially to wind around straight portion 60 by one or more turns. In some embodiments, contact portion 61 may comprise a conical and/or spiral shape such that a winding radius becomes larger by a thickness of pin 6 or more per pitch with increasing proximity from a first end toward a second end of straight portion 60. Accordingly, when straight portion 60 of pin 6 is pushed into small hole 51, contact portion 61 may act as a coil spring when contracted or depressed, and contact portion 61 may resemble a spiral when viewed from above. This may reduce a length of a protrusion of contact portion 61 from an end surface of small hole 51 to a degree of a thickness of pin 6.

Additionally, contact portion 61 of pin 6 according to some embodiments may not extend upwards much, if at all. Instead, contact portion 61 of pin 6 may extend laterally, or in a substantially horizontal direction. Thus, contact portion 61 still prevents pin 6 from falling through hole 51, but does not extend much past the structure of relief valve 40 and diaphragm 32. Additionally, pin 6 according to embodiments described herein does not require a bulky coil spring mechanism shown in the prior art. Instead, due to the unique contact portion 61 design of pin 6, water flow through the vale device generates a force on contact portion 61 to cause pin 6 to rotate within small hole 51 and up and down within small hole 51.

In some embodiments of valve device 100, pin 6 may have a retaining portion 62 that bends at a second end of straight portion 60 and extends to a leading end. Retaining portion 62 may be longer than an axial dimension of small hole 51. Accordingly, in valve device 100, when pin 6 is inserted into small hole 51, it may be possible to prevent an inner peripheral surface of small hole 51 from being scratched by a leading end of retaining portion 62.

In some embodiments of valve device 100, valve body 30 comprises elastic diaphragm 32 that may include a hole. In some embodiments, small hole 51 may comprise a cylindrical hole in cylindrical member 5 fitted into hole 32a. Contact portion 61 of pin 6 may be in contact with a first end surface of cylindrical member 5. In some embodiments, cylindrical member 5 may comprise a hardness greater than that of diaphragm 32, suppressing an occurrence of scratches and wear on an inner peripheral surface and an end surface of small hole 51 possibly caused by contact with pin 6.

FIG. 10A-E illustrates several embodiments of an annular flow head. In some embodiments, the flow head may comprise one or more notches on an interior and/or exterior perimeter of the flow head. Additionally, the shape of the notch(es) can vary depending on the design of a flow head. In some embodiments, one or more notches may extend horizontally towards or away from a center of the flow head when the flow head is positioned in a flush valve device.

Figure 10C:
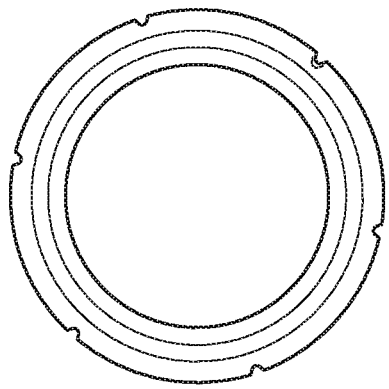
FIGS. 10A-10E are various embodiments of a flow head.
Figure 10B:
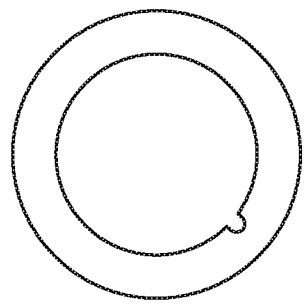
Figure 10E:
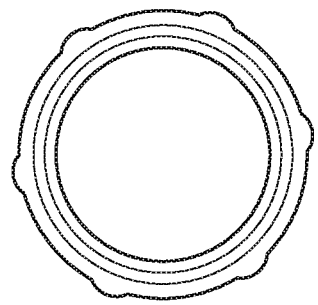
Figure 10A:
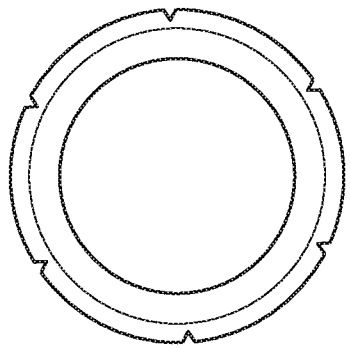

For example, FIG. 10A provides a flow head comprising six notches evenly spaced around an exterior perimeter of the flow head. The six notches of FIG. 10A extend inwardly towards a center of the flow head and are angular and substantially triangular in shape.

FIG. 10B illustrates a flow head comprising a single notch disposed on an interior perimeter of the flow head. The notch of FIG. 10B extends horizontally outwardly from a center of the flow head and is substantially semi-circular in shape. Some embodiments of a flow head may include more than one notch along an interior perimeter of the flow head.

FIG. 10C shows a flow head comprising six evenly spaced notches extending horizontally inwardly towards a center of the flow head and along an exterior perimeter of the flow head, much like FIG. 10A. However, in contrast to those of FIG. 10A, the notches of FIG. 10C are curved. For example, the notches of FIG. 10C may be rounded triangles, semi-ellipses, semi-circular, and/or any combination thereof.

Figure 10D:
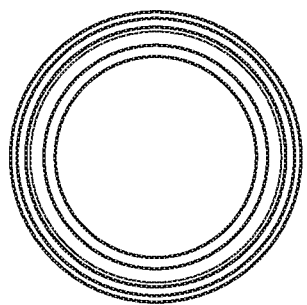

FIG. 10D provides a flow head including no notches. However, a top surface and/or a bottom surface of the flow head may be characterized by one or more raised portions instead of a smooth, flat surface. For example, FIG. 10D illustrates a top surface of a flow head that includes an outermost, substantially circular perimeter, and a raised, central circular portion characterized by an outer perimeter. A bottom surface of a flow head may or may not be similarly characterized. Conversely, FIG. 10B illustrates a flow head comprising a smooth, flat top surface with no raised portions.

FIG. 10E provides a flow head with six curved notches evenly spaced along an exterior perimeter of the flow head. However, unlike the notches of FIGS. 10A and 10C which extend inwardly toward a center of the flow head, the notches of FIG. 10E extend horizontally outwardly from a center location of the flow head.

FIGS. 11A-F provide various views of flow head 34 according to some embodiments. Specifically, FIG. 11A is a cross-sectional view along A-A, FIG. 11E is a cross-sectional view along C-C, and FIG. 11F is a cross-sectional iew along B-B of flow head 34 of FIG. 11D. In some embodiments, an upper and/or lower surface of a flow head may comprise more than one planar surface. For example, upper surface 1102 of a flow head of FIGS. 11A, 11D, 11E, and 11F extends along a plane distinct from that of upper surface 1108, Similarly, lower surface 1112 of a flow head of FIGS. 11A, 11B, 11E, and 11F extends along a plane distinct from that of lower surface 1106. In some embodiments, surface 1106 may be a sealing surface that is configured to engage with retainer 31 of valve body 30.

Flow head 34 of FIGS. 11A-11F comprises three notches 1104 equally spaced around an exterior perimeter of flow head 34. FIG. 11C provides a zoomed-in view of just notch 1104. FIG. 11D shows all three notches 1104 relative to each other.

The size of flow head 34 may be optimized such that it may engage with an inner peripheral surface of an upper portion of inner barrel 14. Accordingly, flow head 34 may be any number of sizes according to need. In some embodiments, flow head 34 may have a radius (measured according to an outermost edge of flow head 34) between 10 and 25 mm, between 11 and 24 mm, between 12 and 23 mm, between 13 and 22 mm, between 14 and 21 mm, between 15 and 20 mm, between 16 and 19 mm, or between 17 and 19 mm. In some embodiments, the radius of a flow head may be greater than 10 mm, greater than 12 mm, greater than 14 mm, greater than 16 mm, greater than 18 mm, greater than 20 mm, or greater than 22 mm. In some embodiments, the radius of flow head 34 may be less than 25 mm, less than 22 mm, less than 20 mm, less than 18 mm, less than 16 mm, less than 14 mm, or less than 12 mm.

In some embodiments, a thickness (or height) of a flow head 34 measured at an outermost edge (and not including any raised surfaces such as 1102 or 1112) may be between 1 and 8 mm, between 1.5 and 7 mm, between 2 and 6.5 mm, between 2.5 and 6 mm, between 3 and 5.5 mm, between 3.5 and 5 mm, or between 4 and 4.5 mm. In some embodiments, a thickness of a flow head 34 measured at an outermost edge (and not including any raised surfaces such as 1102 or 1112) may be greater than 1 mm, greater than 1.5 mm, greater than 2 mm, greater than 2.5 mm, greater than 3 mm, greater than 3.5 mm, greater than 4 mm, greater than 4.5 mm, greater than 5 mm, greater than 5.5 mm, greater than 6 mm, greater than 6.5 mm, greater than 7 mm, or greater than 7.5 mm. In some embodiments, a thickness of a flow head 34 measured an outermost edge (and not including any raised surfaces such as 1102 or 1112) may be less than 8 mm, less than 7.5 mm, less than 7 mm, less than 6.5 mm, less than 6 mm, less than 5.5 mm, less than 5 mm, less than 4.5 mm, less than 4 mm, less than 3.5 mm, less than 3 mm, less than 2.5 mm, less than 2 mm, or less than 1.5 mm.

In some embodiments, the ratio of a height to a radius of flow head 34 may be between 0.04 and 0.80. In some embodiments, the ratio may he between 0.10 and 0.60, between 0.20 and 0.50, or between 0.30 and 0.40. In some embodiments, the ratio of a height to a radius of flow head 34 may be greater than 0.04, greater than 0.1, greater than 0.20, greater than 0.30, greater than 0.40, greater than 0.50, greater than 0.60, or greater than 0.70. In some embodiments, the ratio of a height to a radius of flow head 34 may be less than 0.80, less than 0.70, less than 0.60, less than 0.50, less than 0.40, less than 0.30, less than 0.20, or less than 0.10.

In some embodiments, flow head 34 may comprise one or more notches 1104 along an interior perimeter and/or an exterior perimeter. A notch 1104 according to some embodiments described herein may minimize the water hammer effect. For example, notches along an inner or outer perimeter of a flow head may help minimize the water hammer effect by permitting some water to pass through the main valve during a valve closing process. By permitting a small amount of water to pass through, the notches may lessen the magnitude of a pressure spike that might otherwise occur (and would cause the water hammer effect). A notch may take various forms. For example, a notch 1104 may comprise a flat portion, a curved portion extending into a flow head, a curved portion extending out of a flow head, an angular, substantially triangular portion along a curved perimeter of the flow head, and/or the like.

The ideal number of notches 1104 on flow head 34 depends upon the size and spacing of the notches. In some embodiments, flow head 34 may comprise one notch 1104, more than one notch, more than two notches, more than three notches, more than four notches, more than five notches, more than six notches, more than seven notches, more than eight notches, or more than nine notches. In some embodiments, flow head 34 may comprise ten notches, less than ten notches, less than nine notches, less than eight notches, less than seven notches, less than six notches, less than five notches, less than four notches, less than three notches or less than two notches. In some embodiments, a flow head may comprise between 1 and 5 notches or between 2 and 4 notches. Flow head 34 may comprise notches on an exterior perimeter, on an interior perimeter, or on both an exterior and an interior perimeter. The notches along any one or more single perimeter (interior or exterior) may be evenly spaced or unevenly spaced.

In some embodiments, one or more notches 1104 may comprise a flat portion along a curved perimeter of a flow head. For example, FIG. 11 illustrates flow head 34 comprising three evenly spaced notches 1104 along an exterior perimeter. The notches may be characterized by a length and a width. For example, a length may be measured from one point along the curved perimeter where the notch begins to another point along the curved perimeter where the notch ends. A width may be measured as a distance extending radially between an edge of a notch and a location along the exterior circumference/perimeter of the flow head (as if the flow head comprised a perfectly smooth perimeter without the notch). "Width" refers to the greatest distance extending radially between an edge of a notch and a location along the exterior circumference/perimeter of the flow head, unless otherwise indicated.

A length of notch 1104 may vary depending on the design of flow head 34. In some embodiments, a length of notch 1104 may be between 1 and 5 mm, between 1.5 and 4.5 mm, between 2 and 4 mm, or between 2.5 and 3.5 mm. In some embodiments, a length of notch 34 may be greater than 1 mm, greater than 1.5 mm, greater than 2 mm, greater than 2.5 mm, greater than 3 mm, greater than 3.5 mm, greater than 4 mm, or greater than 4.5 mm. In some embodiments, a length of notch 34 may be less than 5 mm, less than 4.5 mm, less than 4 mm, less than 3.5 mm, less than 3 mm, less than 2.5 mm, less than 2 mm, or less than 1.5 mm.

A width of notch 1104 may also vary depending on the design of flow head 34. In some embodiments, a width of notch 34 may be between 0.1 and 0.6 mm, between 0.15 and 0.5 mm, between 0.2 and 0.4 mm, or between 0.2 and 0.3 mm. In some embodiments, a width of notch 34 may be greater than 0.1 mm, greater than 0.15 mm, greater than 0.2 mm, greater than 0.25 mm, greater than 0.3 mm, greater than 0.35 mm, greater than 0.4 mm, or greater than 0.45 mm. In some embodiments, a width of notch 1104 may be less than 0.5 mm, less than 0.45 mm, less than 0.4 mm, less than 0.35 mm, less than 0.3 mm, less than 0.25 mm, less than 0.2 mm, or less than 0.15 mm.

In some embodiments, the ratio of a width to a length of notch 1104 may be between 0.02 and 0.60. In some embodiments, the ratio may be between 0.05 and 0.55, or between 0.10 and 0.50, between 0.20 and 0.40. In some embodiments, the ratio of a width to a length of notch 1104 may be greater than 0.02, greater than 0.05, greater than 0.10, greater than 0.15, greater than 0.20, greater than 0.25, greater than 0.30, greater than 0.35, greater than 0.40, or greater than 0.50. In some embodiments, the ratio of a width to a length of notch 1104 may be less than 0.60, less than 0.55, less than 0.50, less than 0.45, less than 0.40, less than 0.35, less than 0.30, less than 0.20, or less than 0.10.

In some embodiments, the ratio of a length of a notch 1104 to a radius of flow head 34 may be between 0.04 and 0.50. In some embodiments, the ratio of a length of a notch 1104 to a radius of flow head 34 may be between 0.10 and 0.50 or between 0.20 and 0.40. In some embodiments, the ratio of a notch 1104 to a radius of flow head 34 may be greater than 0.04, greater than 0.10, greater than 0.15, greater than 0.20, greater than 0.25, greater than 0.30, greater than 0.35, greater than 0.40, or greater than 0.45. In some embodiments, the ratio of a notch 1104 to a radius of flow head 34 may be less than 0.50, less than 0.45, less than 0.40, less than 0.35, less than 0.30, less than 0.25, less than 0.20, or less than 0.10.

Figure 12A:
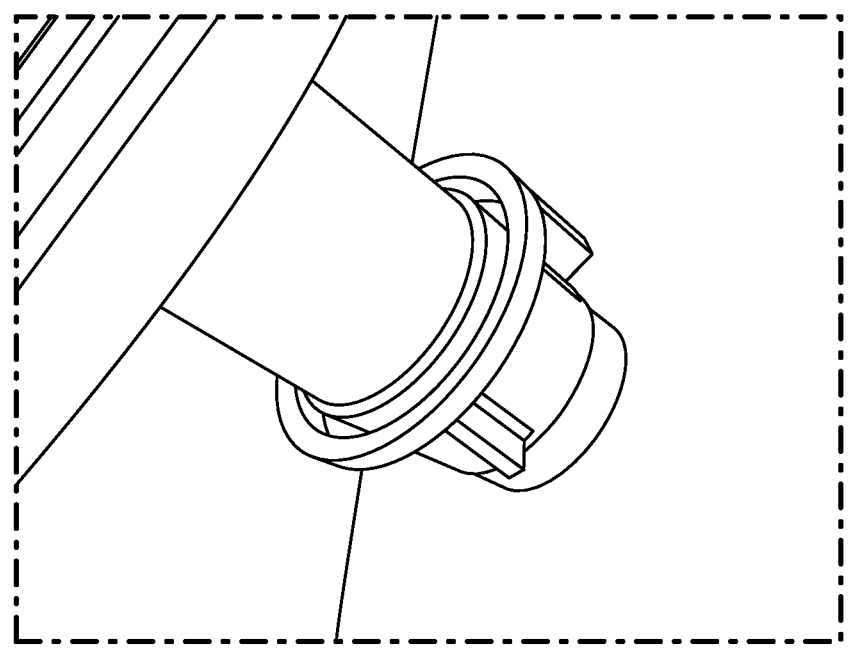
FIGS. 12A-12B are images of fill rings according to some embodiments.
Figure 12B:
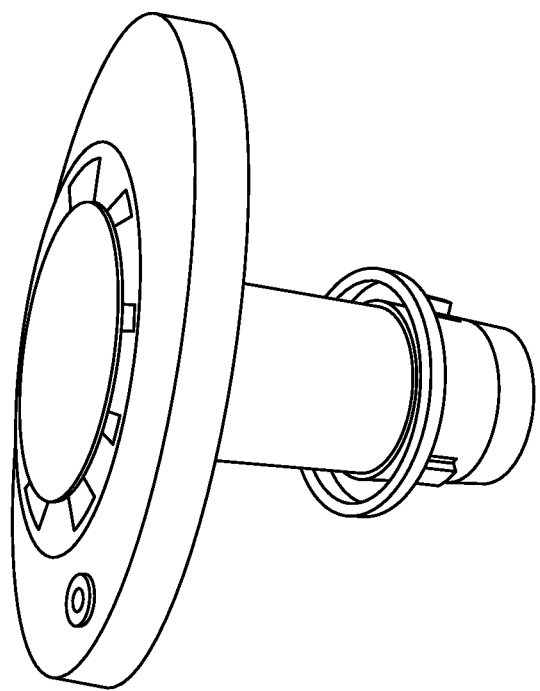
Figure 13:
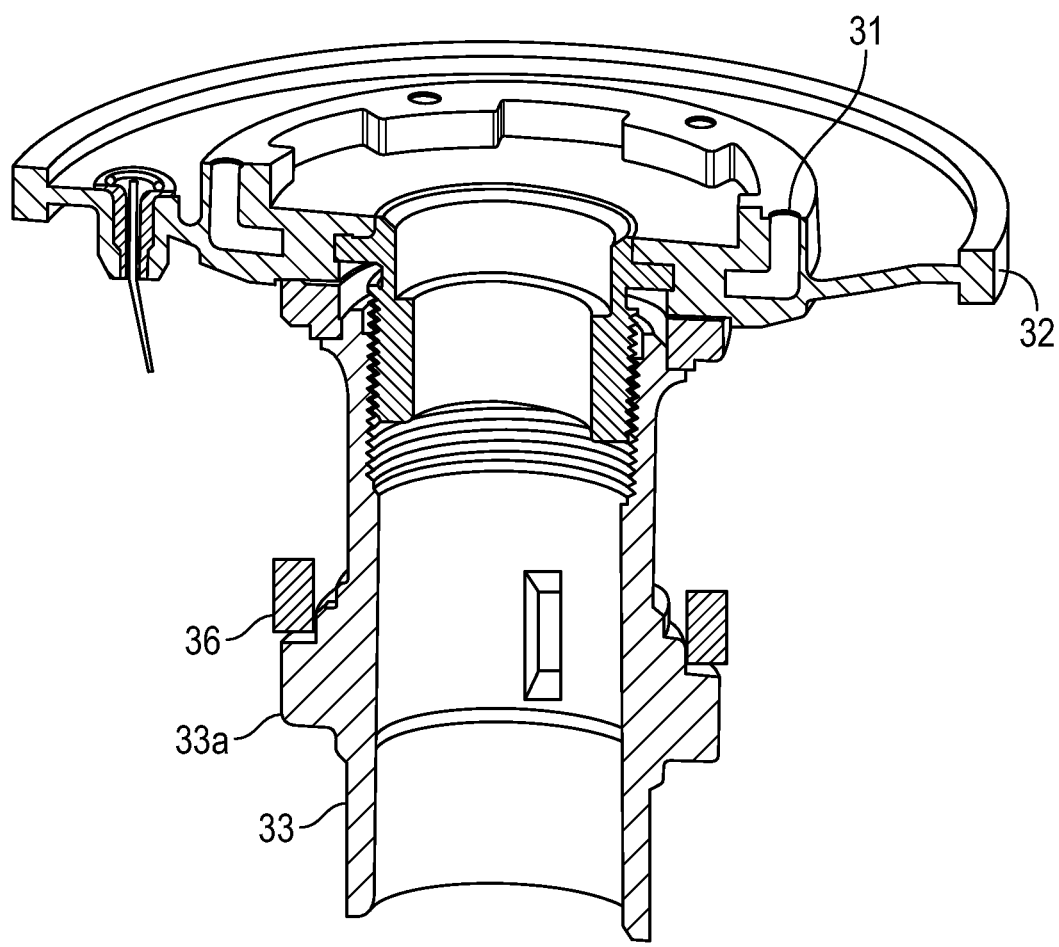
FIG. 13 provides a cross-sectional view of a valve device according to some embodiments.

Finally, FIGS. 12A and 12B show images of valve devices according to some embodiments. Particularly, FIGS. 12A and 12B each illustrate a fill ring disposed around a sleeve pipe of a valve device and held in place by one or more plate-like guides.

The present invention has been described so far based on the embodiments. It should be realized by a person skilled in the art that these embodiments are mere examples and the present invention can be modified and altered in various manners within the scope of the claims of the present invention, and that such modifications and alterations also fall within the scope of the claims of the present invention. Therefore, the descriptions herein and the drawings should be handled illustratively, not in a limited way.

The invention claimed is:

1. A valve device comprising:
    a valve body configured to open and close a valve hole allowing communication between a primary side and a secondary side of a flow path;
    a back pressure chamber positioned at a back side of the valve body;
    a small hole in the valve body to allow communication between the primary side of the flow path and the back pressure chamber; and
    a pin comprising a straight portion inserted into the small hole to clean the small hole by relative motions of the small hole and the straight portion,
    wherein
    the pin has a contact portion that extends radially at a first end of the straight portion, that extends circumferentially to wind around the straight portion by one or less turns, and contacts a peripheral edge of the small hole,
    the contact portion is inclined in a direction from the straight portion first end to a straight portion second end, and
    the pin comprises a retaining portion that bends at the straight portion second end and extends toward a leading end.

2. The valve device of claim 1, wherein the contact portion is elastic in an axial direction of the straight portion.

3. The valve device of claim 2, wherein the contact portion is wound around the straight portion by one turn.

4. The valve device of claim 2, wherein the contact portion is wound in a three-dimensional spiral coil shape such that a winding radius of the spiral coil shape becomes larger with increasing proximity from the straight portion, and the contact portion is wound one or more turns from the first end of the straight portion towards the second end of the straight portion of the pin.

5. The valve device of claim 2, wherein the retaining portion is longer than an axial dimension of the small hole.

6. The valve device of claim 2, wherein the valve body comprises an elastic diaphragm comprising a through hole at a peripheral edge, wherein the small hole is formed as a cylindrical hole in a cylindrical member fitted into the through hole, and wherein the pin contact portion is in contact with an end surface of the cylindrical member, and wherein the cylindrical member comprises a hardness greater than a hardness of the diaphragm.

7. The valve device of claim 1, wherein the contact portion is wound around the straight portion by one turn.

8. The valve device of claim 7, wherein the contact portion is wound in a three-dimensional spiral coil shape such that a winding radius of the spiral coil shape becomes larger with increasing proximity from the straight portion, and the contact portion is wound one or more turns from the first end of the straight portion towards the second end of the straight portion of the pin.

9. The valve device of claim 7, wherein the retaining portion is longer than an axial dimension of the small hole.

10. The valve device of claim 7, wherein the valve body comprises an elastic diaphragm comprising a through hole at a peripheral edge, wherein the small hole is formed as a cylindrical hole in a cylindrical member fitted into the through hole, and wherein the pin contact portion is in contact with an end surface of the cylindrical member, and wherein the cylindrical member comprises a hardness greater than a hardness of the diaphragm.

11. The valve device of claim 1, wherein the contact portion is wound in a three-dimensional spiral coil shape such that a winding radius of the spiral coil shape becomes larger with increasing proximity from the straight portion, and the contact portion is wound one or more turns from the first end of the straight portion towards the second end of the straight portion of the pin.

12. The valve device of claim 11, wherein the retaining portion is longer than an axial dimension of the small hole.

13. The valve device of claim 11, wherein the valve body comprises an elastic diaphragm comprising a through hole at a peripheral edge, wherein the small hole is formed as a cylindrical hole in a cylindrical member fitted into the through hole, and wherein the pin contact portion is in contact with an end surface of the cylindrical member, and wherein the cylindrical member comprises a hardness greater than a hardness of the diaphragm.

14. The valve device of claim 1, wherein the retaining portion is longer than an axial dimension of the small hole.

15. The valve device of claim 14, wherein the valve body comprises an elastic diaphragm comprising a through hole at a peripheral edge, wherein the small hole is formed as a cylindrical hole in a cylindrical member fitted into the through hole, and wherein the pin contact portion is in contact with an end surface of the cylindrical member, and wherein the cylindrical member comprises a hardness greater than a hardness of the diaphragm.

16. The valve device of claim 1, wherein the valve body comprises an elastic diaphragm comprising a through hole at a peripheral edge, wherein the small hole is formed as a cylindrical hole in a cylindrical member fitted into the through hole, and wherein the pin contact portion is in contact with an end surface of the cylindrical member, and wherein the cylindrical member comprises a hardness greater than a hardness of the diaphragm.

17. The valve device of claim 1, comprising
an annular flow head positioned below the valve body, wherein the flow head comprises one or more notches located along a perimeter of the annular flow head, the one or more notches comprising one or more portions carved away from or added to an edge along the perimeter of the annular flow head, wherein the annular flow head is configured to engage with an inner peripheral surface of an upper end portion of an inner barrel of the valve device.

18. The valve device of claim 17, wherein the flow head comprises three notches carved away from an edge of an exterior perimeter of the flow head.

* * * * *